United States Patent [19]

Korhonen et al.

[11] Patent Number: 5,378,935
[45] Date of Patent: Jan. 3, 1995

[54] CLOCK FREQUENCY ADJUSTMENT OF AN ELECTRICAL CIRCUIT

[75] Inventors: Sirpa Korhonen, Ravattula; Rune Lindholm, Salo, both of Finland

[73] Assignee: Nokia Mobile Phones Ltd., Salo, Finland

[21] Appl. No.: 900,006

[22] Filed: Jun. 17, 1992

[30] Foreign Application Priority Data

Jun. 18, 1991 [FI] Finland .................. 912954
Dec. 20, 1991 [FI] Finland .................. 916051

[51] Int. Cl.[6] .................................. G06F 1/32
[52] U.S. Cl. ........................ 327/114; 365/229; 327/292
[58] Field of Search ............... 307/296.3, 269, 243, 307/443, 271; 328/63, 73, 154, 104, 137; 395/550; 365/229

[56] References Cited

U.S. PATENT DOCUMENTS

| | | | |
|---|---|---|---|
| 3,941,989 | 3/1976 | McLaughlin et al. | 235/156 |
| 4,398,155 | 8/1983 | Atwell, Jr. et al. | 328/73 |
| 4,593,390 | 6/1986 | Hildebrand et al. | 370/112 |
| 4,686,386 | 8/1987 | Tadao | 307/209 |
| 4,820,992 | 4/1989 | Avis | 328/137 |
| 4,965,524 | 10/1990 | Patchen | 328/72 |
| 4,970,405 | 11/1990 | Hagiwara | 307/269 |
| 5,086,387 | 2/1992 | Arroyo et al. | 395/550 |
| 5,120,988 | 6/1992 | Matsuki | 307/209 |
| 5,136,180 | 8/1992 | Caviasca et al. | 307/269 |
| 5,155,390 | 10/1992 | Gongwer et al. | 307/480 |
| 5,227,672 | 7/1993 | Sawtell | 302/269 |

FOREIGN PATENT DOCUMENTS

| | | | |
|---|---|---|---|
| 0012232 | 6/1980 | European Pat. Off. | G06F 1/00 |
| 0419908A2 | 4/1991 | European Pat. Off. | G06F 1/32 |
| 0421431A2 | 4/1991 | European Pat. Off. | G06F 1/32 |
| 852293 | 6/1985 | Finland . | |
| 912954 | 2/1992 | Finland . | |
| 59-200538 | 11/1984 | Japan . | |
| WO85/02275 | 5/1985 | WIPO | G06F 1/04 |

OTHER PUBLICATIONS

48009 Sep. 1980 Tokyo et al.
460 (P946) (3808) Oct. 1989, Patent Abstract of Japan vol. 13.

*Primary Examiner*—John S. Heyman
*Assistant Examiner*—Dinh Le
*Attorney, Agent, or Firm*—Perman & Green

[57] ABSTRACT

The power consumption of an electrical device can be optimised by altering the clock frequency of circuits (MCU, 1-3) in the device which are controlled by a clock signal. The state and need for processing power of the circuits (MCU, 1-3) or blocks (21-23) in the circuits (2) is supervised, and the clock frequency of the circuit (MCU, 1-3) or block (21-23) in the device is changed according to the need for processing power. The appropriate clock frequency is selected from one of a plurality of clock signals (clk(1) ... clk(n)), input to a selection circuit which is then coupled to the output of the selection circuit for use as the clock for the circuit.

21 Claims, 6 Drawing Sheets

CLOCK FREQUENCY ADJUSTMENT OF AN ELECTRICAL CIRCUIT

FIELD OF THE INVENTION

The present invention relates to the adjustment of the clock frequency of an electrical circuit of an electrical device.

BACKGROUND OF THE INVENTION

In equipment run by batteries it is important to minimize the power consumption in order to prolong the battery lifetime and thus the operating time of the equipment. The power consumption of electronic equipment can be affected in many different ways. In particular, devices with CMOS circuits are characterized by the fact that power consumption is a linear function of the clock frequency. Furthermore, many devices such as radiotelephones have several local clock frequencies for different parts or circuits of the device. Also, different blocks of the circuits such as integrated circuits can comprise local clock frequencies. Continuous clocking of these circuits and blocks by a high constant clock frequency, even when the operation of a circuit or a block is low, causes unnecessary power consumption. The need for processing power varies largely in mobile phones of cellular systems. For instance, with the telephone in standby the need for processing power is small, whereas in active mode it can be 10 to 100 times greater. It is obvious that the radio telephone must provide the circuits with the required processing power, otherwise it will not operate.

SUMMARY OF THE INVENTION

According to the present invention, there is provided an electrical device comprising at least one circuit controlled by a clock signal having a predetermined frequency, the device comprising means for supervising the state and need for processing power of the circuit and means for changing the clock frequency into a lower frequency when the power requirement of the circuit is lowered, and into a higher frequency when the power requirement is increased. This has the advantage that by lowering, for example, the clock frequency in many electronic systems to save the battery when the system is not in the active state i.e. when the power requirement is low, power is saved. When the system is put into use again, i.e., when it moves into the active state, the clock frequency should immediately be increased back to normal. By decreasing the clock frequency of a circuit such as a CMOS circuit by 50%, the power consumption of the circuit can be decreased to the same degree. Vice versa, an increase in the clock frequency is needed, for instance, for decreasing the amount of parallel processing of data, whereby the number of components of the equipment can be decreased and savings can be made on the material costs.

According to a second aspect of the present invention, there is provided a selection circuit for selecting a new clock signal in place of an old clock signal for output from the selection circuit, the circuit comprising selecting means for selecting the new clock signal from at least two clock signals of different frequencies coupled to inputs of the selection circuit, and switching means arranged to receive the new clock signal at an input and operable to couple the new clock signal from its output to the selection circuit output in response to a control signal.

Thus the clock frequency of a whole circuit or a block in the circuit, where it is individually clocked, can be altered. Thus, the power consumption of an electrical system such as a radio telephone can be optimised by continuously supervising the state and need for processing power of the circuits and the circuit blocks of the system, and by immediately altering the local clock frequencies of said circuits and blocks when even small changes occur in the states of the circuits/blocks. As a result of such changes it is possible to decrease or increase the clock frequency to satisfy the need for processing power.

The old clock signal may be coupled to the circuit output via the switching means, the switching means having first and second inputs, the new and old clock signals being coupled to respective first and second inputs. The switching may be operable to couple the old clock signal to the circuit output while the new clock signal is coupled to the first input and, to then switching so as to couple the new clock signal to the selection circuit output. The switching may be operable to maintain the second input in a first state while the old clock signal is coupled to the circuit output and while the new clock signal is coupled to the first input and to change the state of the first input to the state of the new clock signal as it is coupled to the circuit output. Preferably the first input state is not changed until it is the same as the state of the first input. This has the advantage that during the changing phases, no disturbing signals, such as peaks, must appear in the clock signals, which disturbances may cause a malfunction of the processor.

When the rate or the clock frequency of the circuits such as digital circuits in a radio telephone is continuously adjusted in accordance with the processing power required, the total power consumption of the telephone is considerably decreased.

BRIEF DESCRIPTION OF THE DRAWINGS

The invention will now be described by way of example only, with reference to the accompanying drawings, of which.

BRIEF DESCRIPTION OF THE PREFERRED EMBODIMENT

Power consumption of an electrical device can be optimised using supervision logic/supervision electronics which can be placed, depending on the implementation, outside the circuits of the electrical device or can be integrated into the circuits such as customer specific integrated circuits (ASIC). These electronics supervise a circuits' power requirements and alter the clock frequency of that circuit depending upon that requirement i.e. the clock frequency is increased or decreased when the power requirement is lowered or increased respectively. When there is a microprocessor, the device can be arranged to monitor its own need for processing power and transmission activity between the circuits of the system (the need for processing power of each circuit can be determined separately on the basis of this activity). If required, the processor controls can alter of its own clock frequency and that of the other circuits. If a device does not include a microprocessor, supervision logic/supervision electronics can be added to carry out the above-mentioned supervision/control functions. In addition, supervision logics/electronics can be integrated into the circuits. This should naturally be taken into account when designing said circuits (ASIC circuits). The microprocessor or global supervision logics/electronics can supervise and control the local clock frequencies of the circuits of the device as well. This is done by activating the circuits with the aid of external signals to change the local clock frequencies to desired sizes according to the need for processing power.

The circuitry for implementing this power optimisation adopts two main principles. Firstly, an old clock signal is coupled to the output of a selection circuit of the supervision/control function while the selection of an appropriate new clock signal and the preliminary connection is being carried out. The new signal is coupled the circuit output for use as the new clock frequency. The changeover from the old to new clock signals is done at a moment when both the old and the new clock signal simultaneously satisfy given predetermined conditions, i.e. the first principle involves the picking of the convenient moment of shifting, at which both the signals are in a pre-selected identical state as the shift takes place. The new clock signal is usefully connected to the output just after it has been changed into the selected state. The selected same state advantageously equals the zero state of the positive logic.

By means of selected circuit, the desired signal can be picked from among several input clock signals and be coupled to the output of the circuit. The circuit is given some time to choose the new clock signal, the circuit being thus usable also at high frequencies, since the selection and the preliminary connections take place during the operation of the old clock signal.

According to the second principle, the actual shift of the clock signals is carried out so that no peaks caused by the changeover switch appear in the selected clock signal in the circuit output.

Normally, the clock signals connected to the inputs can be synchronized signals, i.e. their phases would always have a specific mutual relation. The clock signals may also be based on the same basic clock, so that the various signal frequencies are multiples of the frequency of the basic clock. However, clock signals that are not mutually synchronized can be used, since, according to the invention, the state of both the input and the output clock signal are controlled during the changeover.

The circuit comprises a control logic, digitally indicated selecting means of the input clock signals, as well as a switching means, which controlled by the control logic, connects the clock signal selected by the selecting circuits to the circuit output. The selecting means are advantageously disposed in two branches, one of which respectively conducts the selected clock signal to the circuit output, and the other branch of which is used for conducting the selected new clock signal to the change over switching means.

The circuit according to the invention is usefully applied to clock signals, the frequency of which is in the range of 1–50 MHz. The signals concerned may be multi-level signals, but are advantageously binary signals. The changeover rate of the circuit according to the invention is only limited by the setting times of the control logic, connected with the triggering of the new clock and the preventing of the old clock signal.

The clock frequency can be decreased in one or more steps to satisfy the need for processing power. The significant feature of the present invention is namely that the clock frequencies of the circuits and circuit blocks of the system are altered into another frequency of a somewhat or essentially different size immediately even during a slight change in the state and the need for processing power of said circuits or circuit blocks. Thus the present invention does not only supervise the state of the system, whether the system is in standby or active state, but it supervises even small potential, changes in the states in different parts, the changes making it possible to decrease a clock frequency or requiring its increasing. Thus the present invention uses for changing the frequency, for instance, a circuit arrangement that functions as a switch and receives as its input a number of different predetermined clock frequencies of which the desired frequency is guided to the output of the circuit arrangement from where the clock signal goes to the circuit or circuit block using the clock frequency.

Figure 1:
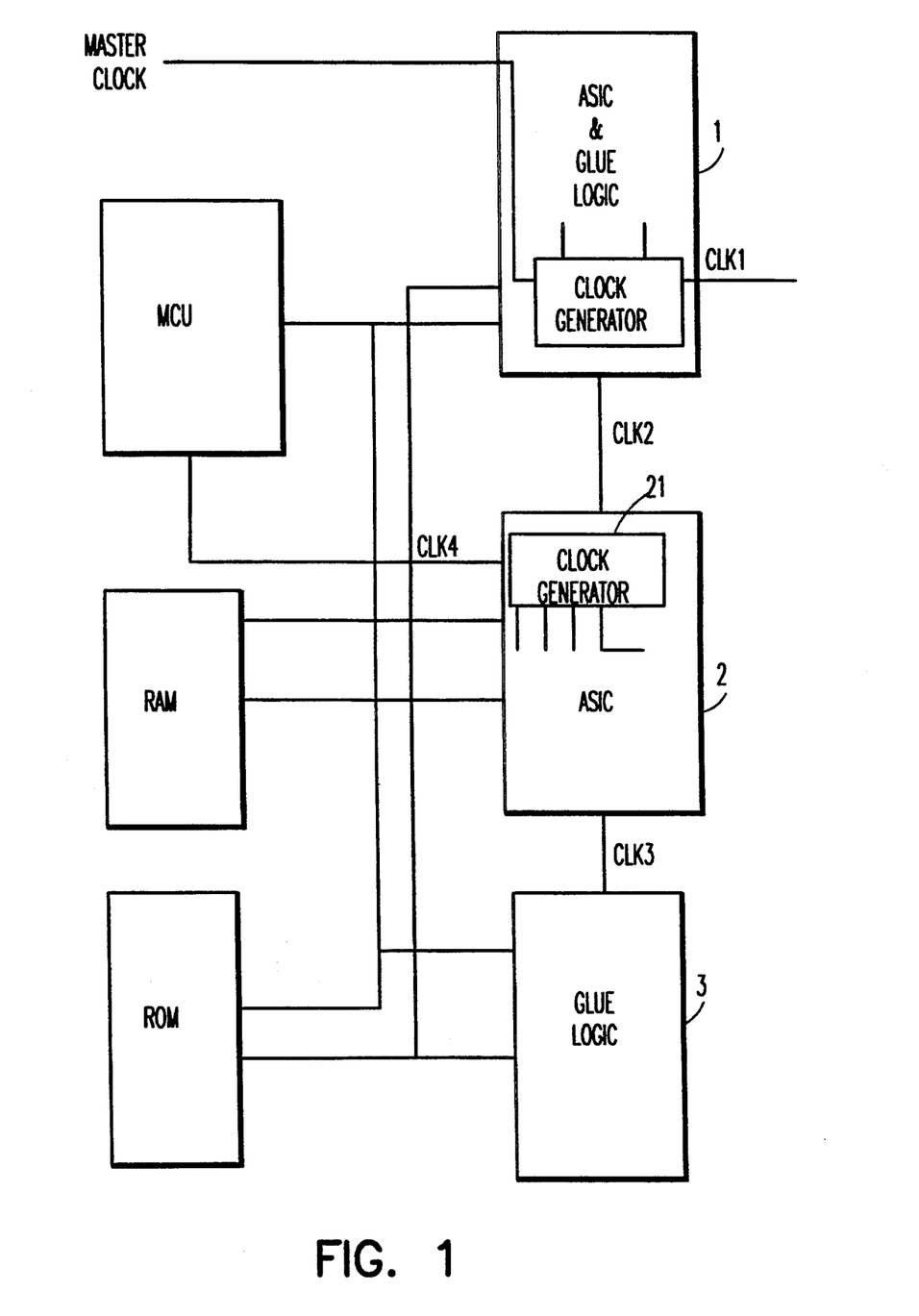
FIG. 1 is a block diagram illustrating the supervision of clock frequency in a device containing circuits controlled by a clock signal.

FIG. 1 shows an example of the distribution of clock frequencies in an electrical device, for example a cellular radio telephone, comprising circuits some of which are controlled by a clock signal. The figure shows an example of different ways to implement the digital circuits of a radiotelephone and it shows that a mobile phone or any other electrical device can comprise integrated circuits such as a microprocessor MCU (Micro Computer Unit), ASIC circuits 2, circuits 3 realized by a dedicated logic and circuits 1 which are combinations of these. In practice a radiotelephone mainly comprises ASIC circuits because of its small size. A clock frequency MASTER CLOCK which controls the system is produced by, for example, a crystal oscillator. Local generation of clock frequencies can be implemented in ASIC circuits 2 with the aid of, for example, phase-locked loops. In addition, local supervision logic can be integrated into the ASIC circuits for supervising the need for processing power and for controlling the change of the clock frequency. The clock frequency of microprocessor MCU can be supervised and controlled by the microprocessor itself or by another circuit, as in this example where the clock frequency of the microprocessor MCU is controlled by the ASIC circuit 2 which receives the clock signal from a circuit 1 which the system's basic clock frequency MASTER CLOCK is supplied to. The microprocessor MCU does not control, in this case, its own clock frequency or that of the other circuits 1 to 3.

Figure 2:
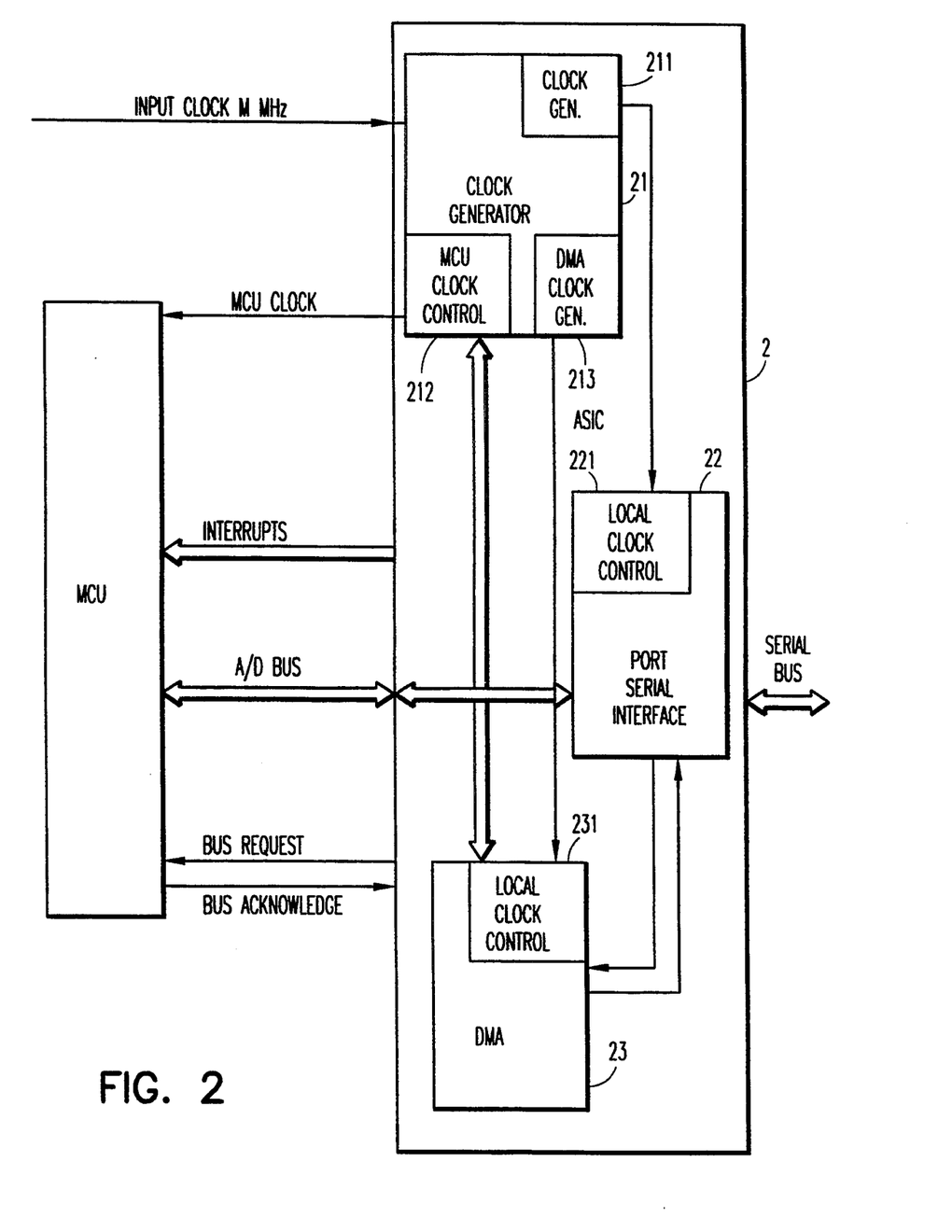
FIG. 2 is a block diagram illustrating the control of the clock frequency inside an integrated circuit in the device of FIG. 1.

FIG. 2 shows an example of the realization and control of the local clock frequencies in an integrated circuit, here ASIC circuit 2. ASIC circuit 2 also controls the clock frequency of the microprocessor MCU. It is obvious to a person skilled in the art that the ASIC circuit 2 can contain several other components and blocks other than the ones illustrated in the figure. This figure shows as an example blocks 21 to 23 which include local supervision of the need for processing power and clock frequency control. Thus, ASIC circuit 2 comprises clock generator block 21, fast serial interface 22 and Direct Memory Access (DMA) control 23. Clock generation block 21 generates through local clock generator 211 the clock frequencies for other blocks in the ASIC circuit 2 and it also comprises clock control 212, 213 for microprocessor MCU and DMA block 23. The clock signal is taken from a clock generation block 21 to the fast serial interface 22 which comprises its own clock control logic/electronics 221.

The fast serial interface 22 is basically a parallel to series converter i.e. Parallel-In Series-Out (PISO) using time-derived channeling. Because of the time-derived channeling, the fast serial interface 22 is faster than an asynchronous or synchronous parallel to series converter and it uses different time slots for transmission and reception. The output clock frequency obtained from the fast serial interface 22 is normally N MHz or N/2 MHz. The rate of this output frequency is controlled by the microprocessor MCU. In addition, the microprocessor MCU is able to change the clock frequency into a lower one to save power, whereby the output clock frequency provided by the fast serial interface 22 is decreased to N/16 or N/32 MHz, for instance, depending on which frequency initially was programmed as the output frequency. This decreasing of the output clock frequency is effected automatically, if the fast serial interface 22 has been totally inactive for a predetermined period of time. If any activities occur while the fast serial interface 22 is on a lower clock frequency, its supervision logic identifies this and alters the output of the fast serial interface 22 back into a higher frequency and the clock of the sensor (not shown) identifying the activities is set to zero. Because the fast serial interface 22 is also used to clock the internal data of ASIC circuit 2, the internal power consumption of the circuit is also decreased.

The fast serial interface 22 uses the DMA control 23 in the ASIC circuit 2 for data transmission on the bus to the microprocessor MCU. Microprocessor MCU tells the DMA control where to find the information needed and the DMA control 23 reads data from the memory of microprocessor MCU. When the microprocessor MCU has provided the DMA control with the proper address for finding the data, the microprocessor MCU can continue doing other activities. Using the DMA control 23 for retrieving data from the memory of the microprocessor (instead of the microprocessor doing it) accelerates information retrieval from the memory. The clock of the DMA control 23 is switched on when the fast serial interface 22 requires operations from the DMA control 23. For this reason the DMA control 23 is active during very short periods of time and is not needed when there is no activity. Thus the DMA control 23 is not clocked all the time, because a mere decrease in the clock frequency would not be of any use in this case due to the fact that while the DMA control 23 is active (on a low or high frequency), the microprocessor MCU is prevented from carrying out other functions. Therefore, it is preferable to switch off completely the clock of the DMA control 23 when it is not used. Thus a lot of power is saved, because the DMA control 23 contains a considerable amount of logic. The DMA control 23 also comprises its own supervision logic/electronics 231.

The clock frequency of the microprocessor MCU is controlled by the ASIC circuit 2. However, the command to decrease the clock frequency of the microprocessor or to stop the clock is given by the microprocessor MCU. The ASIC circuit 2 supplies the microprocessor with such frequencies as M, M/2, M/4, M/8 or M/16 MHz.

However, all the interrupts for the microprocessor MCU are generated in the ASIC circuit 2. To ensure a fast interrupt response, the ASIC circuit 2 switches the clock frequency of the microprocessor MCU to maximum speed when the interrupt command is generated. The clock frequency is altered into a lower one after the interrupt when the device is, for example in standby mode, or if for some other reason the activity is small. Since the performance of the microprocessor is generally not used to 100%, the clock frequency can be decreased almost any time. However, the clock frequency is then so selected that the momentary processing power needed is maintained.

Figure 3:
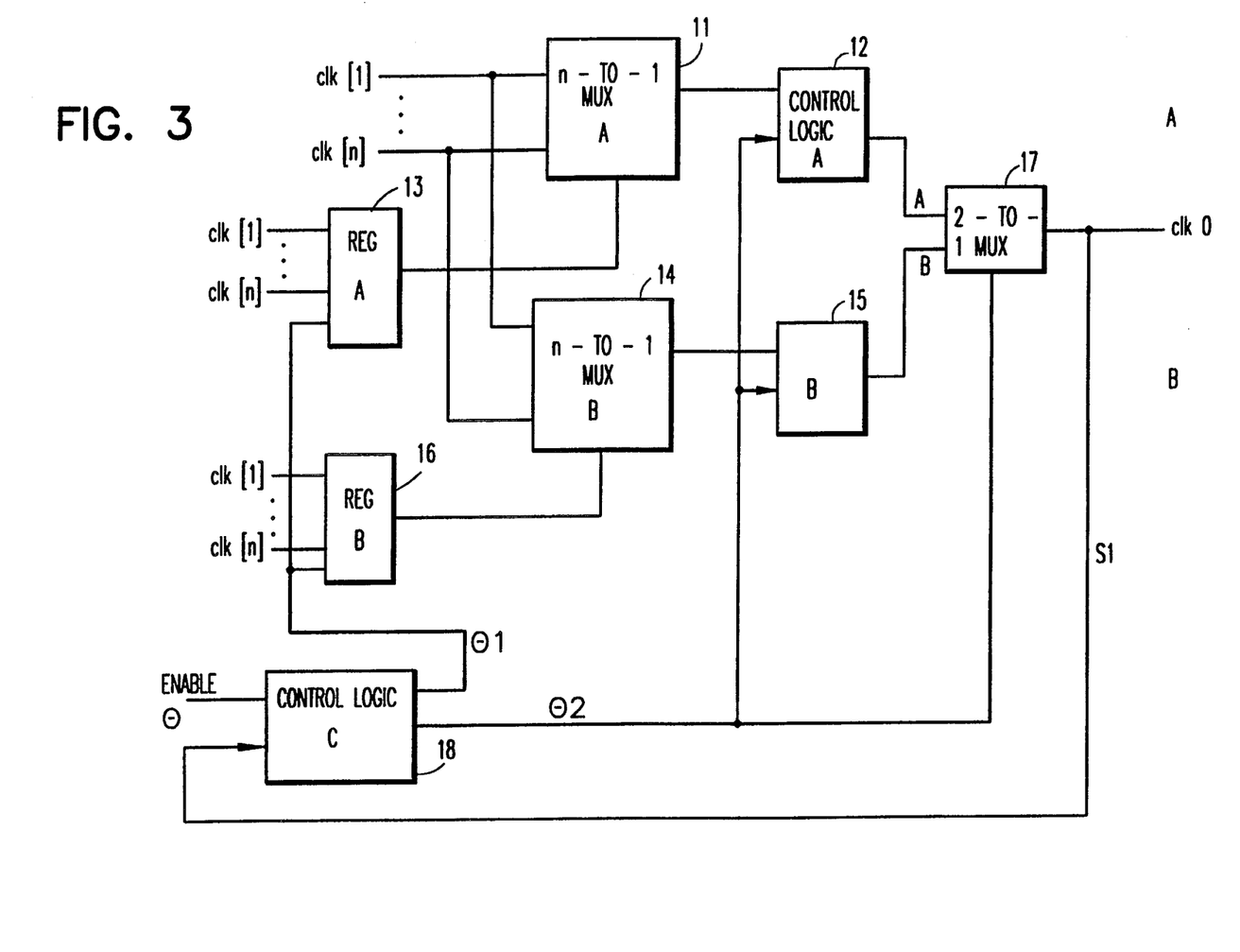
FIG. 3 is a schematic block diagram illustrating the circuit according to the invention.

FIG. 3 shows a schematic block diagram of the circuit for effecting the clock frequency change. Clock signals of different frequencies are coupled into two branches A and B via inputs clk(1) . . . clk(n), selecting means 11, 14 and the control logic 12, 15 to a changeover circuit 17. The selecting means 11, 14 consist of n:1 multiplexers and the changeover circuit 17 is a 2:1 multiplexer. Registers 13, 16 receive the address signals sel (1) . . . sel(m) of the clock signal, whereby the number m has been selected so that, according to the binary system, each of the m address signals sel (1) . . . sel(m) indicates unambiguously in a manner known to a person skilled in the art one selected clock signal n among the clock signals clk(1) . . . clk(n). Thus, supplying a particular select signal sel(1) . . . sel(m) to the registers 13, 16 enables one of the clock signals clk(1) . . . clk(n) to be supplied to the control logic 12, 15, via the respective selecting means 11, 14. The control logics 12, 15 maintain the inputs of the changeover circuit 17 in the respective selected first state, i.e. as a logical zero, during the changeover process in accordance with the control of the control logic 18. The control logic 18 controls the circuits 11-17 with trigger signals e1, e2, and the control logic 18 is controlled by an enable signal e.

In a stable state, i.e. after the change of the clock signal, the selected clock signal is coupled in either of the branches A and B to form an output signal clko output from the changeover switch 17. Supposing that a selected one of the clock signals clk(1) . . . clk(n) is conducted to the output clko via the first input of the change-over circuit 17, i.e. in the branch A then in this case, the branch B is in a blocking state, i.e. under the effect of the control logic 15 the second input B of the changeover circuit 17 is in the zero state.

An enable signal e supplied to the control logic 18 starts the shift of the clock signal in this circuit. The enable signal e triggers a pulse e1 from control logic 18 to the registers 13, 16, causing an address (1 . . . n) of the desired input clock signal clk(1) . . . clk(n) to be loaded into the register 16 of the branch B and the clock signal thus selected to be coupled up to the control logic 15 via the selecting means 14 in the branch B. At this stage, the output of the control logic 15 still remains in the zero state. At the next descending edge of the output clock clko a select signal S1 is supplied to the control logic 18 so that it supplies a control pulse e2 to the control logic 15, which switches the input of the changeover switch 17 to the branch B. At the same time, the input of the branch A to the changeover circuit 17 is set into the zero state. Subsequently, the selected clock signal in the branch B is released with the control logic 15 and coupled using the control pulse e2 via the control logic 15 to the second input B of the changeover switch 17. In this way, the new clock signal becomes the output clock signal clko through the branch B. The changeover from outputting input B instead of input A and the setting of input A to zero is effected by control signal e2 which is also supplied to control logic 12 and changeover switch 17.

The next time, the clock signal shift takes place so that a new clock signal is selected as the output clock signal clko through branch A, in a similar series of steps to that described above.

Figure 4A:
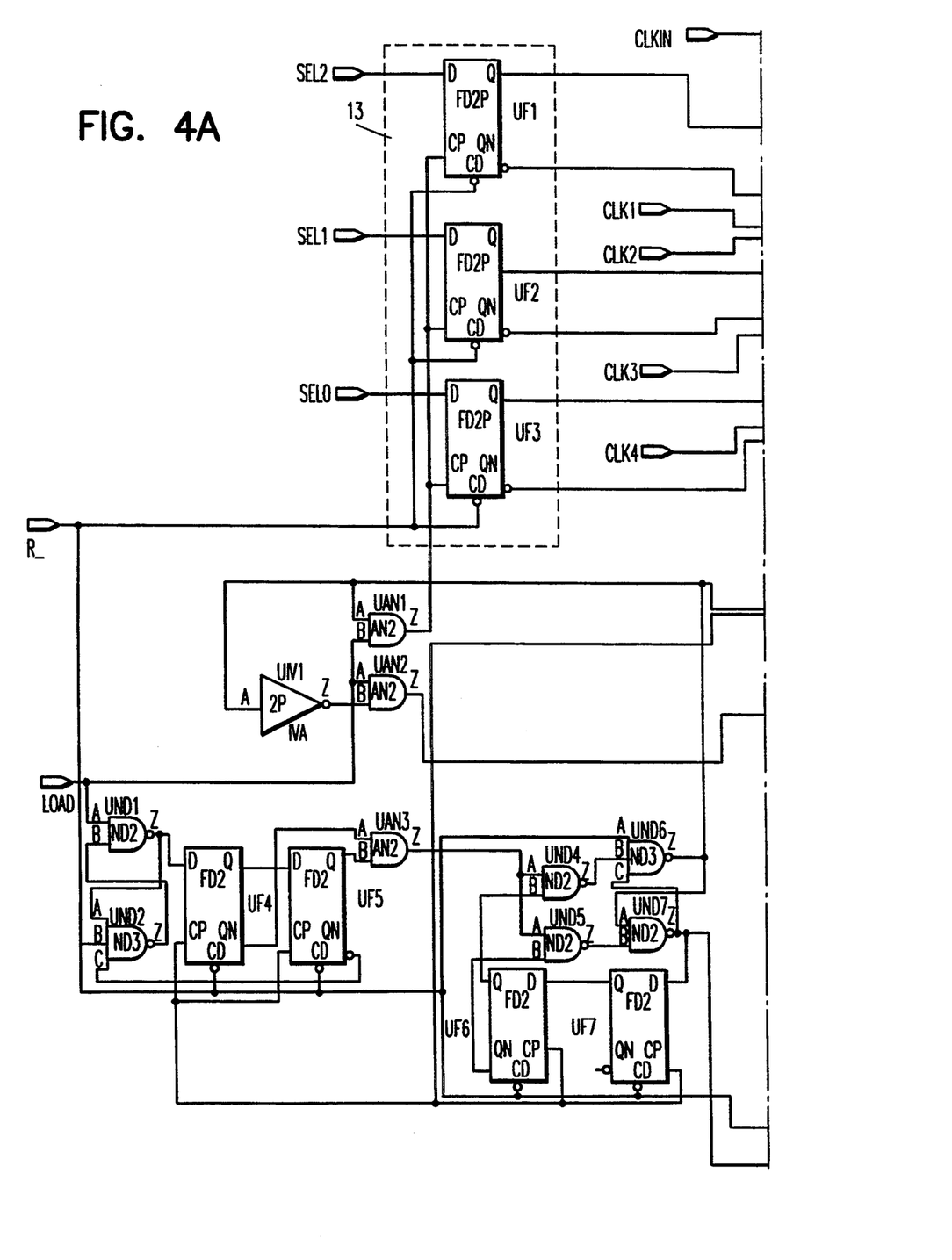
FIGS. 4A and 4B are adjacent parts of a detailed circuit diagram of one embodiment example of the invention.
Figure 4B:
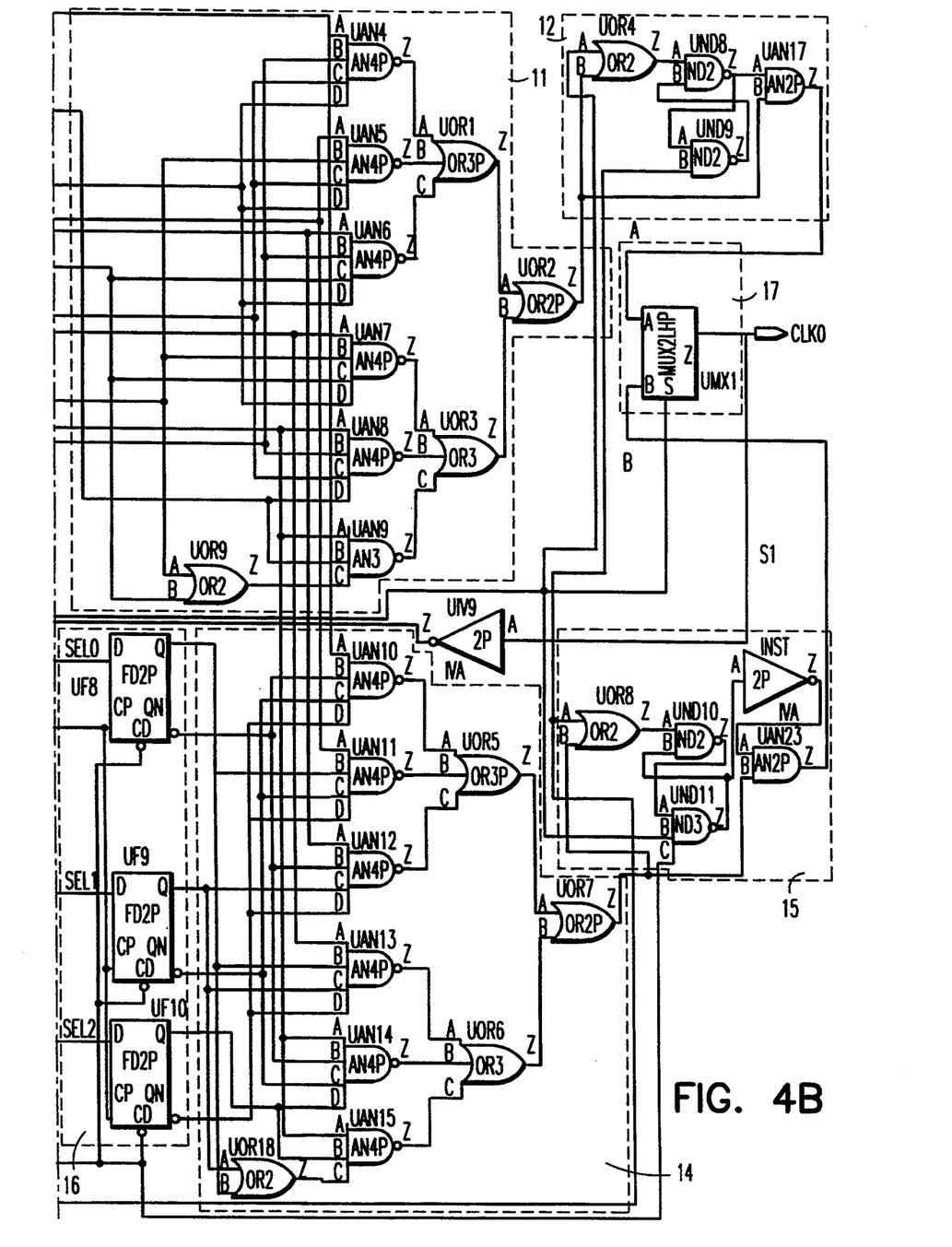

FIG. 4 shows a more detailed circuit diagram of the circuit illustrated in FIG. 3. With this circuit, any of the input clocks CLKIN, CLK1 . . . CLK4 (i.e. clk(in), clk(1) . . . clk(4)) may be selected as the output clock CLKO i.e. clko. There are five input clocks and their frequencies in this example are 26 Mhz, 13 Mhz, 6.5 Mhz, 3.25 Mhz and 1.625 MHz. The blocks illustrated in FIG. 3 are shown by hatched lines in FIG. 4. The circuit comprises as in FIG. 3 two selecting means 11, 14, by means of which the desired clock signal is selected. The selecting means 11, 14 are controlled using registers 13, 16, into which the addresses of the clock signals CLK1N . . . CLK2 supplied by the selection lines SEL0 . . . SEL2 usel(0) . . . sel(2) are recorded. In this case, the changeover switch 17 is equaled by the circuit UMX1, and this serves for the selection of the clock signal CLKO to be coupled from the output of the selecting means 11, 14 to the circuit output.

The descending edge of the pulse LOAD i.e. the enable signal, starts the shifting operation of the clock signal of the circuit. The LOAD signal is provided by a circuit (not shown) connected to a microprocessor for instance, the clock signal of which is selected by means of the circuit according to the invention. The LOAD signal is first conducted to a holding circuit (UND1 and UND2), thus ensuring a sufficiently long start pulse for the circuit of FIG. 4 even when the LOAD pulse is very short. The output 11 of the holding circuit (UND1 and UND2) remains at zero after the triggering during one period of the start pulse CLKO. At the ascending edge of the pulse LOAD, the address of the selected new input clock according to the selection signals SEL0 . . . SEL2 supplied to the inputs of the registers 13, 16 is conducted to the inactive selecting means multiplexer 11 or 14. At this stage the active selecting means 11 or 14 continues to coupling the currently selected clock signal via the changeover switch UMX1 to the output CLKO. The active branch, i.e. the selecting means 11 or 14 supplying the currently selected clock signal to the output CLKO is selected with selection signal s1 of UMX1; the selected selecting means is 11 (input A of UMX1) if s1=1, and respectively, the selected selecting means is 14 (input B of UMX1) if s1=0.

After the LOAD signal has ascended to state 1, the following next edge of the output clock CLKO brings about the generation of a pulse using circuits UF4, UF5, which changes the state of the selection signal s1 of the circuit UMX1. This is equivalent to the pulse e2 of FIG. 3 supplied to the change over switch 17. Since the pulse is formed on the descending edge of the output clock CLKO, the clock signal to be connected to the output of the circuit can be exchanged for the clock signal coming through the second inactive branch (A or B), the state of which is maintained at state 0 using control logic (12 or 15) at the input of the multiplexer UMX1. If for instance the state of the signal s1 is 0, i.e. the input A of UMX1 is selected, the input B is kept in the state 0 using a holding circuit formed by UND10 and UND11. The new selected clock signal is connected to the output CLKO at the following descending edge of the new clock signal. When the state of the new clock signal passes to 0, it guides the output of the holding circuit UND10 and UND11 to the state 1, and consequently, the new selected clock signal i.e. that clock signal to be coupled as the output CLKO now reaches the input B of the multiplexer UMX1 through the gate UAN23. The input A of UMX1 which was being coupled as output CLKO is set to the state 0 with the help of the holding circuit UND8 and UND9, when the state of the signal s1 has changed and the old clock signal (in the input A of UMX1) descends to the state 0. With the following LOAD pulse the multiplexer UMX1 selects the input B to be connected to the output CLKO.

The purpose of the flip-flops UF6 and UF7 in the circuit of FIG. 4 is to delay the change of the output of the holding circuit (UND6 and UND7), this output controlling the triggering of the new clock signal. The delay is carried out in order to ensure that the new branch has already been connected to the output of the circuit and that the change over pulse has ended, so that the holding circuit is in a stable state. This ensures that no peaks or uncontrolled state variations appear in the output clock.

Figure 5:
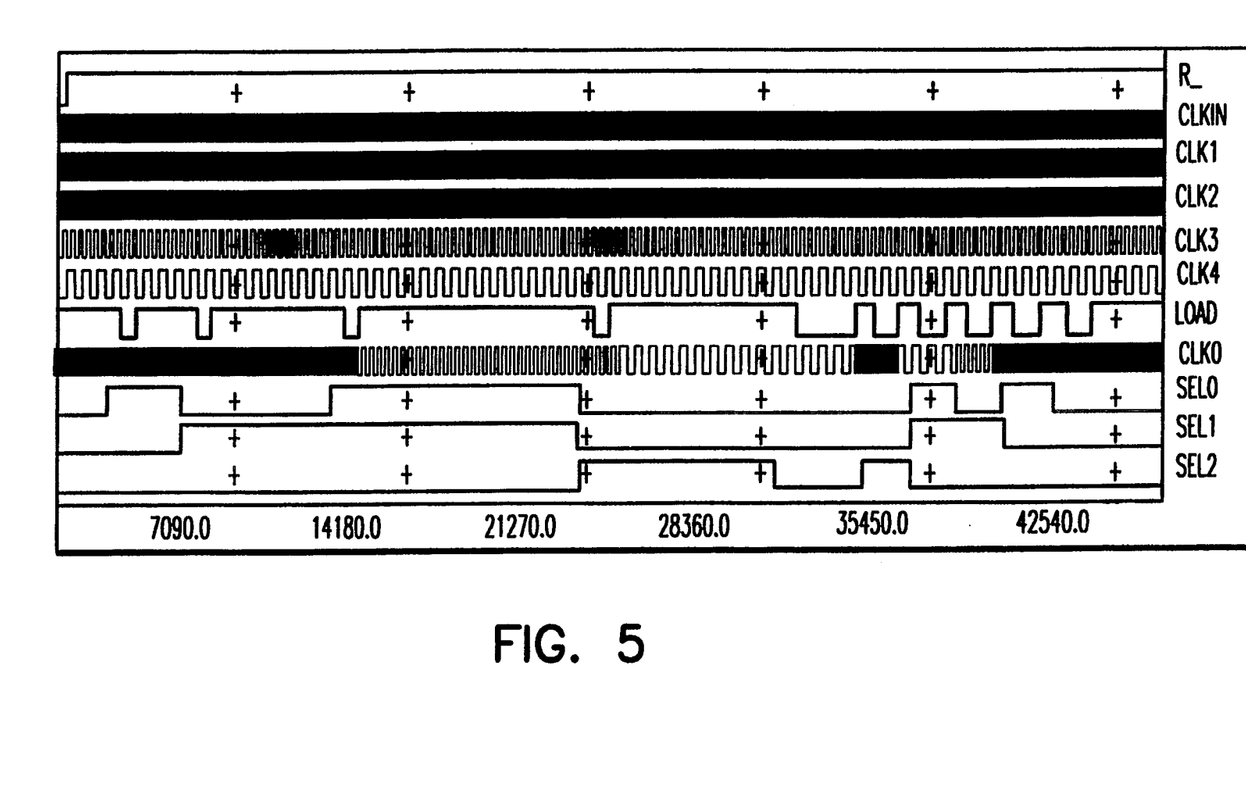
FIG. 5 shows the pulse patterns recorded during the simulation of the circuit according to FIG. 2 and appearing on the various signal lines.

FIG. 5 illustrates the pulse patterns recorded in connection with the simulation of the circuit of FIG. 4. FIG. 5 shows the logical dependences between the clock signals CLKIN, CLK1 . . . CLK4, the address signals SEL0 . . . SEL2, the trigger signal LOAD and the output clock signal CLKO, as a function of time. The signal R represents a reset signal of the circuit. The indications of the time scale mark nano- seconds.

Although one embodiment example of the circuit according to the invention has been described in detail above, a person skilled in the art realizes that the method according to the invention is applicable to various circuit solutions.

We claim:

1. An electrical device comprising at least one circuit controlled by a clock signal having a predetermined frequency the device comprising:
   means for supervising the state and need for processing power of the said circuit; and
   means connected to said supervising means for changing the clock frequency into a lower frequency when the power requirement of the said circuit is lowered, and into a higher frequency when the power requirement is increased
   wherein said means for changing the clock frequency includes switching means for changing the clock frequency into a lower frequency when said clock frequency and said lower clock frequency are in the same pre-selected identical state.

2. A device according to claim 1, wherein said circuit is connected within an integrated circuit in said electrical device and the supervising means is connected on said electrical device externally to said integrated circuit.

3. A device according to claim 1, wherein said circuit is connected within an integrated circuit in said electric device and the supervising means is connected in said electrical device internally as a part of the integrated circuit.

4. A device according to claim 1 wherein said circuit is connected within an integrated circuit in said electrical device and the said clock frequency changing means is connected on said electrical device externally to said integrated circuit.

5. A device according to claim 1 wherein the clock frequency changing means is a part of the circuit.

6. A device according to claim 1 wherein the supervising means and the clock frequency changing means is integrated.

7. A selection circuit having input leads and output leads for selecting a new clock signal in place of an old clock signal to provide a new output clock signal from the said output leads of said selection circuit, the selection circuit comprising a source of control signals, selecting means connected to said selection circuit input leads and to said source of control signals for selecting the new clock signal from at least two clock signals of different frequencies coupled to said inputs of the selection circuit; and switching means connected to said source of control signals and including input and output leads for receiving the said new clock signal at an input lead and operable to couple the new clock signal from its said output lead to the said selection circuit output lead in response to a first control signal from said source of control signals, wherein said switching means couples said new clock signal to said selection circuit output when said old clock signal and said new clock signal are both in the same state.

8. A circuit according to claim 7 wherein the old clock signal is coupled to the circuit output lead via the switching means, the switching means having first and second inputs, the new and old clock signals being coupled to said respective first and second inputs of said switching means.

9. A circuit according to claim 8 wherein the said switching means is operable to couple the old clock signal to the said selection circuit output lead while the new clock signal is coupled to the said switching means first input, and to then switch so as to couple the said new clock signal to the said selection circuit output lead.

10. A circuit according to claim 9 wherein the said switching means is operable to maintain the said switching means second input in a first state while the old clock signal is coupled to the said selection circuit output lead and while the new clock signal is coupled to the said switching means first input, and to change the state of the said switching means first input to the state of the new clock signal as it is coupled to the said selection circuit output lead.

11. A circuit according to claim 10 wherein the first switching means input state is not changed until it is the same as the first input.

12. A circuit according to claim 7 including control logic and operable to initiate the selection of the new clock signal by the said selection circuit in response to a second control signal from said source of control signals.

13. A circuit according to claim 12 wherein said selecting means is operable to select the new clock frequency in response to a third control signal from said source of control signals being triggered in response to the said second control signal.

14. A circuit according to claim 12 wherein the said control logic is operable to trigger a control pulse in response to a fourth control signal from the said switching means, the said fourth control signal being triggered by the descending edge of the said old clock signal output from the said switching means after the said new clock signal has been selected by the said selecting means.

15. A circuit according to claim 7 wherein the said selecting means is a multiplexer circuit means.

16. A circuit according to claim 7 wherein the said switching means in multiplexer circuit means.

17. A method for adjusting the power consumption of an electrical device comprising at least one circuit controlled by a clock signal having an existing predetermined frequency, by Step 1. supervising the state and need for processing power of the said at least one circuit and Step 2. changing the said existing predetermined clock frequency of the circuit into a lower frequency when the power requirement of the said circuit is lowered and into a higher frequency when the power requirement is increased, wherein said step of changing the clock frequency of the circuit into a lower clock frequency includes switching the clock frequency into said lower frequency when said clock frequency and said lower clock frequency are in the same pre-selected identical state.

18. A method according to claim 17, wherein said circuit is an integrated circuit in said electrical device and wherein the state and need for processing power of the circuit in Step 2 is supervised in said electrical device externally of the integrated circuit.

19. A method according to claim 17, wherein said circuit is an integrated circuit in said electrical device and wherein the state and need for processing power of the circuit is supervised internally of the circuit.

20. A method according to claim 17 wherein, in Step 2, said existing predetermined clock frequency is changed by coupling a new clock signal from a selection circuit operable to select the appropriate new clock signal from one of at least two input clock signals of different frequencies input to the changeover circuit.

21. A method according to claim 20, wherein, in Step 2 the said existing predetermined clock frequency is switched to zero when said new clock signal is selected in said changing step.

* * * * *